United States Patent [19]
Bronzino et al.

[11] Patent Number: 5,716,058
[45] Date of Patent: Feb. 10, 1998

[54] CHUCK

[75] Inventors: Walter Bronzino; Pier Mauro Bronzino, both of Turin, Italy

[73] Assignee: SMW Autoblok Spannsysteme GmbH, Meckenbeuren, Germany

[21] Appl. No.: 618,479

[22] Filed: Mar. 18, 1996

[30] Foreign Application Priority Data

Mar. 18, 1995 [DE] Germany .................. 195 09 976.1

[51] Int. Cl.$^6$ ................................................ B23B 31/167
[52] U.S. Cl. ............................ 279/121; 279/123; 279/125
[58] Field of Search ............................. 279/121, 123, 279/125, 110

[56] References Cited

U.S. PATENT DOCUMENTS 3,606,364  9/1971  Benjamin et al. ............... 279/121
3,870,323  3/1975  Beckers ............................. 279/112
4,243,236  1/1981  Rohm ................................. 279/125

FOREIGN PATENT DOCUMENTS 2736753  2/1979  Germany .

*Primary Examiner*—Steven C. Bishop
*Attorney, Agent, or Firm*—Robert W. Becker & Associates

[57] ABSTRACT

A chuck having jaws that are displaceable in radial guideways and can be operated by wedge bars. The wedge bars can be displaced beyond a working space to such an extent that the teeth thereof disengage from the teeth of the pertaining jaw. Each of the wedge bars has disposed therein a pin that projects into the guideways and that has an inclined surface that cooperates with the pertaining jaw; the pin can be displaced against the force of a spring. During exchange of the jaws, the wedge bars can be locked in an end position by the pins.

10 Claims, 4 Drawing Sheets

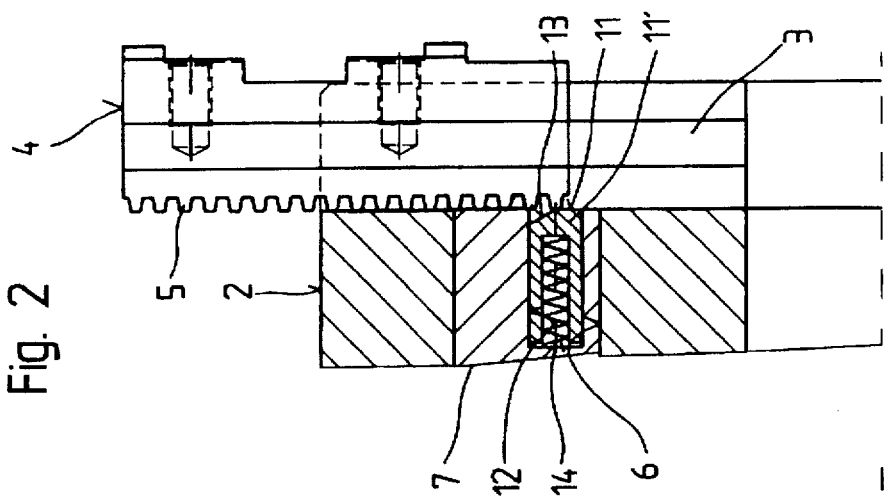
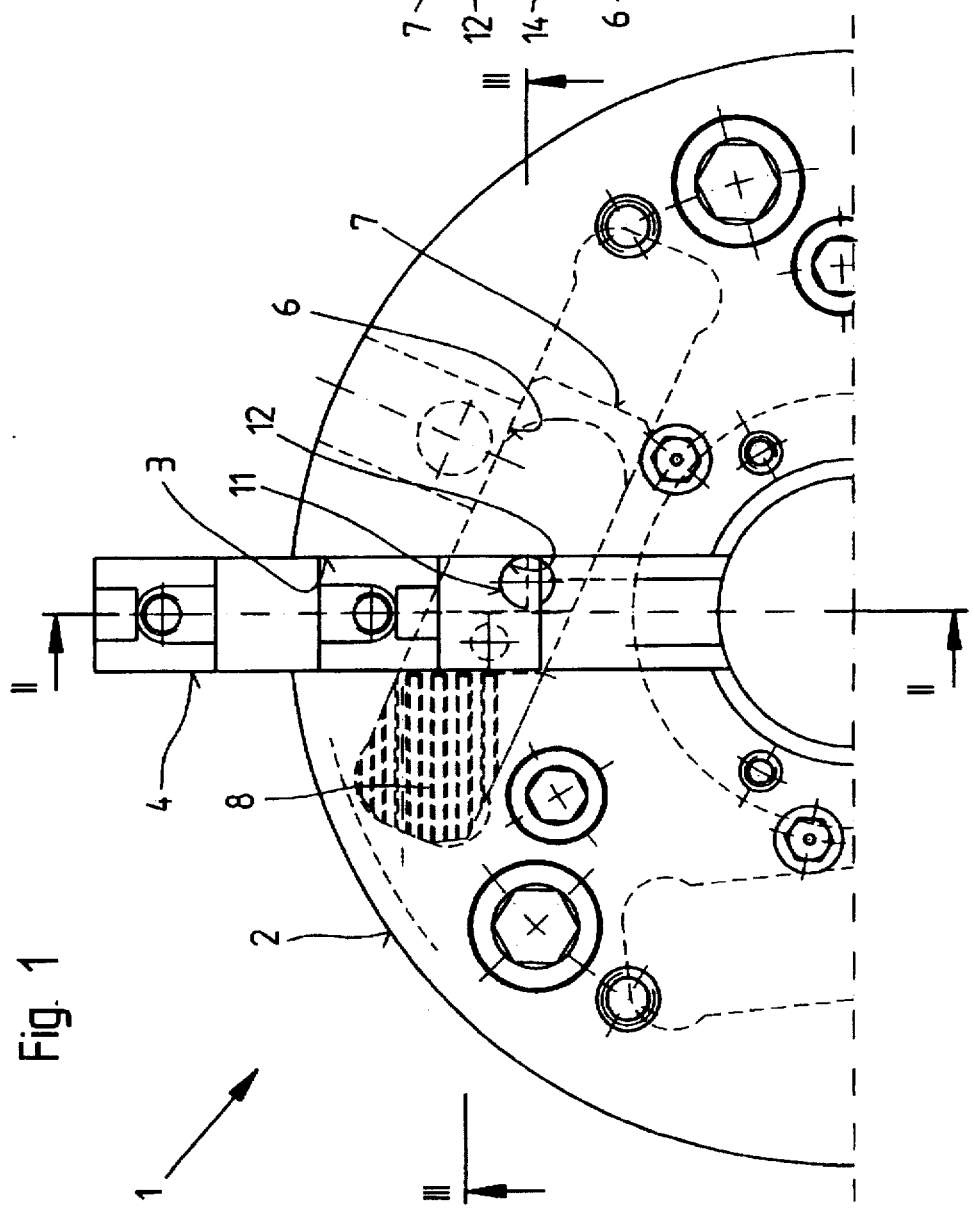

CHUCK

BACKGROUND OF THE INVENTION

The present invention relates to a chuck for turning machines, and has jaws that are displaceable in radially extending guideways and that can be respectively driven by a wedge bar that is disposed in a receiving pocket in the chuck body transverse to the longitudinal axis and has teeth that engage teeth of the jaw. In addition, the wedge bars can be moved in the receiving pockets beyond the working space to such an extent that the teeth of the wedge bars disengage from the teeth of the pertaining jaw so that the jaws are removable radially out of the guideways.

DE-C-27 36 753 discloses a chuck of this general type. Although this known chuck has proven itself to be quite satisfactory in practice, unfortunately when the jaws are inserted there is, however, no guarantee that the teeth of the jaws will satisfactorily overlap with the teeth of the wedge bars. Although with this known chuck, in order to position the teeth so that they can engage one another, spring-loaded pins are provided that are movable in the wedge bars and that cooperate with the teeth of the jaws, this does not prevent, for example, only a single tooth of a jaw engaging with teeth of a wedge bar. And of course if the overlap of the teeth is minimal, the teeth can be sheared off when high clamping forces are exerted. In addition, the jaws of a chuck are sometimes incorrectly inserted into the guideways and are not at the same level; in such a case, a later, time consuming correction is absolutely necessary.

It is therefore an object of the present invention to improve a chuck of the aforementioned general type in such a way that one is always ensured that upon insertion of a jaw, and hence during replacement or exchange of jaws, the prescribed number of teeth of the jaws always engage the teeth of the wedge bars, thus precluding shearing off of the teeth, and that all of the jaws of a chuck can always be inserted into the guideways to the same depth or level without difficulty. The required structural expense to accomplish this should be kept low, yet exchange of jaws should to a large extent be facilitated and should be able to be carried out in a short period of time without having to correct positioning errors.

BRIEF DESCRIPTION OF THE DRAWINGS

These and other objects and advantages of the present invention will appear more clearly from the following specification in conjunction with the accompanying schematic drawings, in which:

FIG. 1 is a front view of one exemplary embodiment of the inventive chuck with pins inserted into the wedge bars thereof to lock the wedge bars during jaw replacement;

FIG. 2 is a cross-sectional view taken along the line II—II in FIG. 1;

SUMMARY OF THE INVENTION

Figure 3:
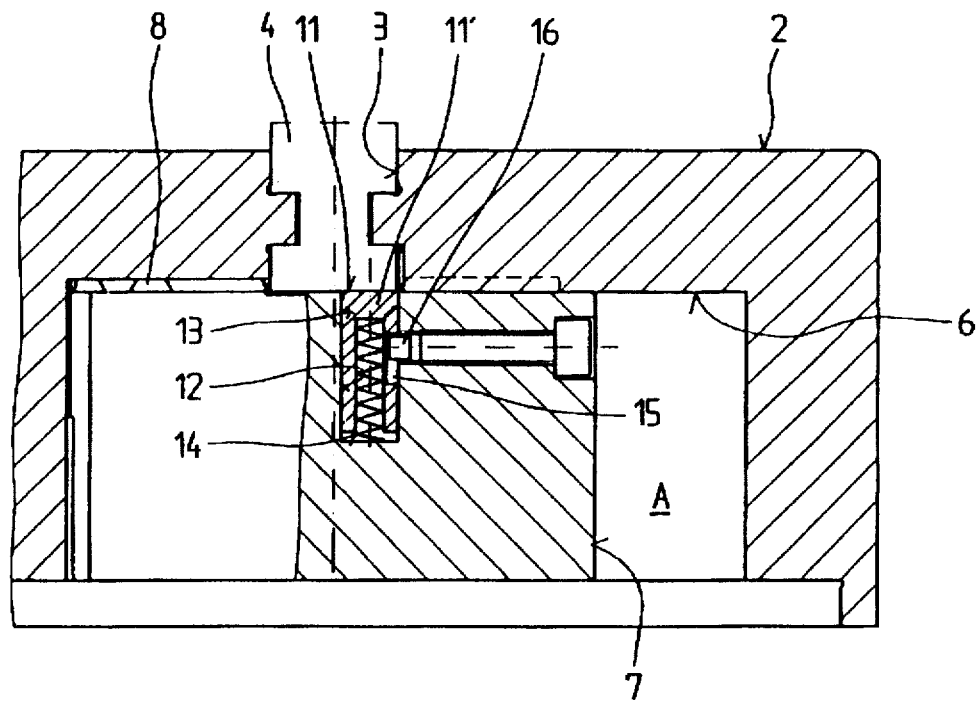
FIGS. 3 and 4 are cross-sectional views taken along the line III—III in FIG. 1 showing different operating modes.

The chuck of the present invention is characterized primarily in that pins are disposed in the wedge bars or in the chuck body, such pins respectively extending into the guideways of the jaws in a zone coordinated with the engagement position of the teeth of the jaws in the teeth of the wedge bars, with each of the pins having disposed on an end thereof that extends into the guideways an inclined surface that cooperates with the associated jaw, the pins being displaceably guided against the force of a spring; during exchange of the jaws, the wedge bars can be locked in an end position either directly by the pins or by stop members that are actuated by the wedge bars.

In this connection, the pins can be positioned and displaceable axially perpendicular to the guideways in holes formed in the wedge bars; to arrest the wedge bars the pins can laterally rest against those side surfaces of the guideways that face away from the working space of the wedge bars, and when the wedge bars are disposed in the working space can rest against the chuck body.

It is furthermore suitable to provide each of the pins with an axially directed recess, and to provide the wedge bars with a pin or the like that is disposed therein and axially perpendicular to the first pin, in the recess of which it engages to hold the first pin in the correct orientation.

However, pursuant to a modified specific embodiment, it is also possible to dispose the pins axially perpendicular to the guideways and to respectively dispose them in a hole that is formed into the chuck body, next to a guideway, on that side that is closest to the working space of the wedge bars. The stop members can be disposed in recessed portions formed in the chuck body axially perpendicular to the pins, with the stop members being displaceable by the force of a spring in the direction of the receiving pockets. The pins can cooperate via inclined surfaces with the stop members that project into the receiving pockets.

When the jaws are exchanged, the end faces of the wedge bars that face the working space are to rest against the stop members, and the pins are to be supported against the jaws when the wedge bars are in the working space.

Furthermore, that end of each of the pins that faces the stop members should be provided with an inclined surface that extends at an angle to the axial direction, and the stop members should be provided with a recess that accommodates a pin and has a surface that cooperates with the inclined surface of the pin.

It is also appropriate for each of the pins to be provided with an axially directed recess, with a further pin or the like being disposed in the chuck body axially perpendicular to the pin for engaging the recess thereof in order to hold the pin in a properly oriented position.

The chuck of the present invention always guarantees that when a jaw is inserted a sufficient overlap of the teeth of the jaws with the teeth of the wedge bars results, and that before the chuck is placed into operation all of the jaws are disposed at the same level in the guideways. This is because as a consequence of the pins, or the stop members that are actuated by the pins, the wedge bars are locked in an end position. And as long as the wedge bars are locked in position, a key that is used to actuate the wedge bars cannot be removed and the chuck cannot be set into operation. In this connection, the locking action can be eliminated only by the jaws, and in particular only when the jaws are in a prescribed position that ensures that at least two or more of the teeth of the jaw engage the teeth of the wedge bars. This precludes teeth from being sheared off, even when high clamping forces are being transmitted.

Since the pins of a chuck are always at the same height or level, a further advantage is that all of the jaws can be disposed in a straightforward manner at a uniform level into the guideways without requiring additional aids to accomplish this and without in so doing having to undertake corrections. There is also ensured in a straightforward manner that components located in the vicinity of a chuck will not be damaged by projecting jaws; rather, the extent of projection of the jaws can be prescribed by the position of the pins that engage in the guideways of the jaws. As a consequence of the inventively proposed chuck structure, the operational reliability of the chuck is remarkably increased and an exchange of jaws can be realized in a short period of time in a straightforward manner without thereby having to worry that the jaws will be improperly located.

Further specific features of the present invention will be described in detail subsequently.

DESCRIPTION OF PREFERRED EMBODIMENTS

Figure 5:
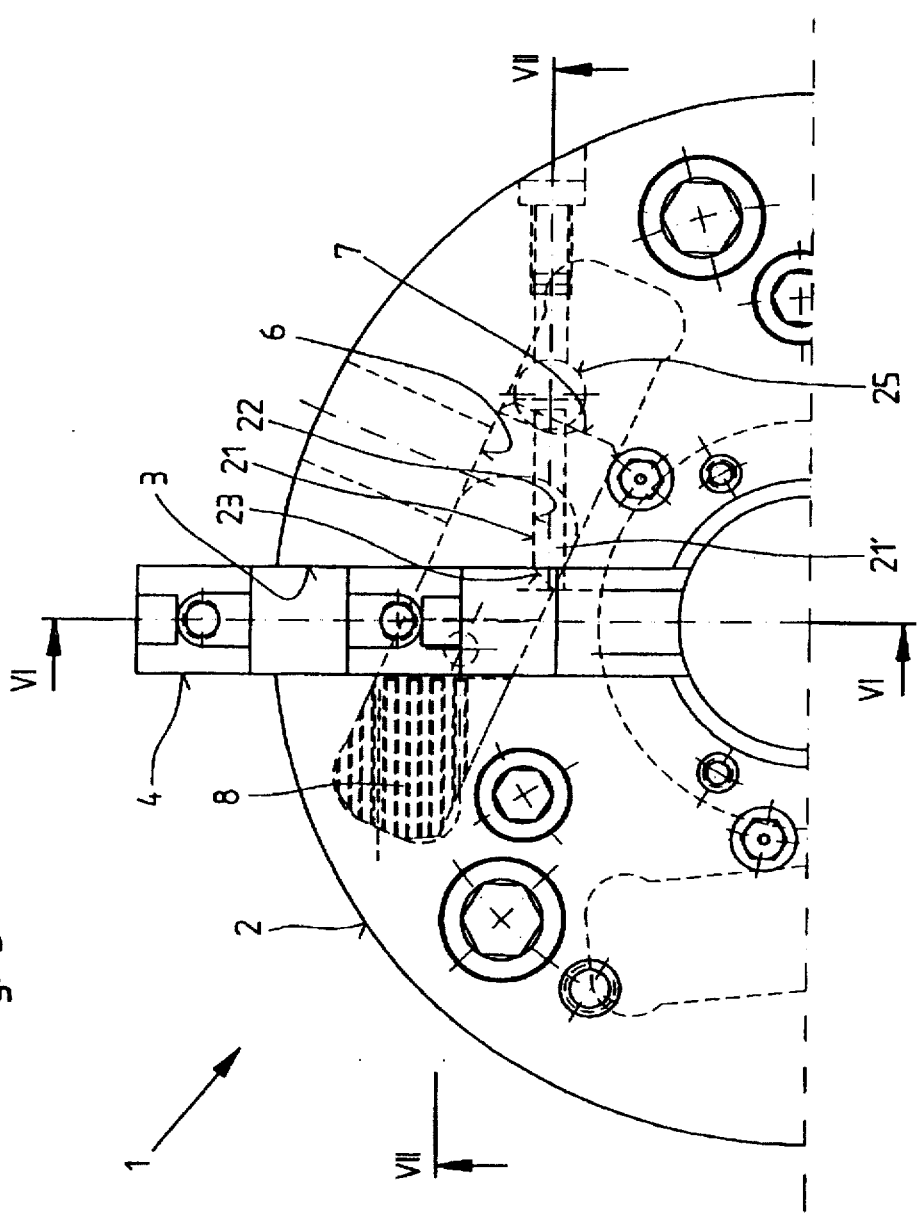
FIG. 5 is a front view of a modified embodiment of the inventive chuck showing pins disposed in the chuck body and engaging in the guideways of the jaws.
Figure 7:
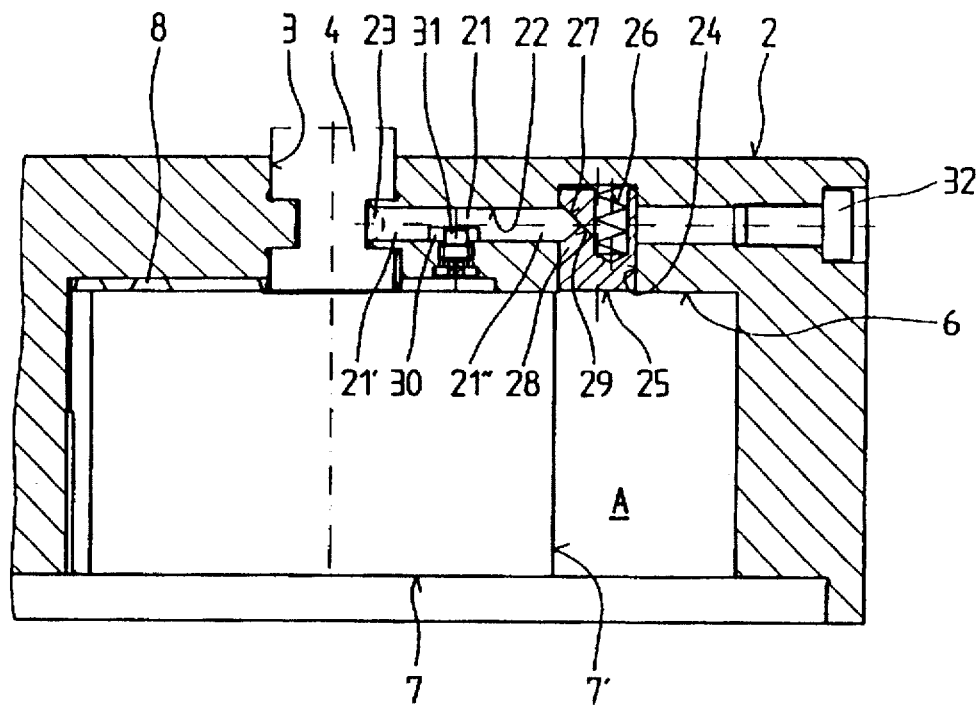
FIGS. 7 and 8 are cross-sectional views taken along the line VII—VII of FIG. 5 showing different operating modes.

Referring now to the drawings in detail, FIGS. 1 and 5 illustrate a chuck that is designated generally by the reference numeral 1. This chuck has an annular chuck body 2, in the front side of which a respective jaw 4 is disposed in each of three radially directed guideways 3; a non-illustrated workpiece is clamped or chucked between the jaws 4 during machining thereof. A respective wedge bar 7 is provided to radially displace the jaws 4 inwardly or outwardly. The wedge bars 7 are disposed in receiving pockets 6 formed in the chuck body 2 tangential to a base circle. Teeth 8 of the wedge bars 7 engage teeth 5 of the associated jaws 4. Furthermore, the inner surface of the wedge bars 7 are provided with non-illustrated, inclined wedge surfaces with which cooperate shoulder wedges formed on an axially displaceable piston. To exchange the jaws 4, the wedge bars 7, as illustrated in FIGS. 1 and 5, are shifted to the left to such an extent that the teeth 8 thereof no longer engage the teeth 5 of the jaws 4, so that the jaws can be withdrawn from the guideways 3.

To facilitate insertion of the jaws 4 and in so doing to always ensure that all of the jaws 4 of the chuck 1 are always disposed at the same level and have a prescribed number of the teeth 5 engage with the teeth 8 of the wedge bars 7, in the embodiment of FIGS. 1 to 4 a pin 11 is positioned in a hole 12 in each of the wedge bars 7. That end 11' of the pin 11 that faces the jaw 4 is provided with an inclined surface 13. The pin 11 can be displaced by a jaw 4 against the force of a spring 14.

Figure 4:
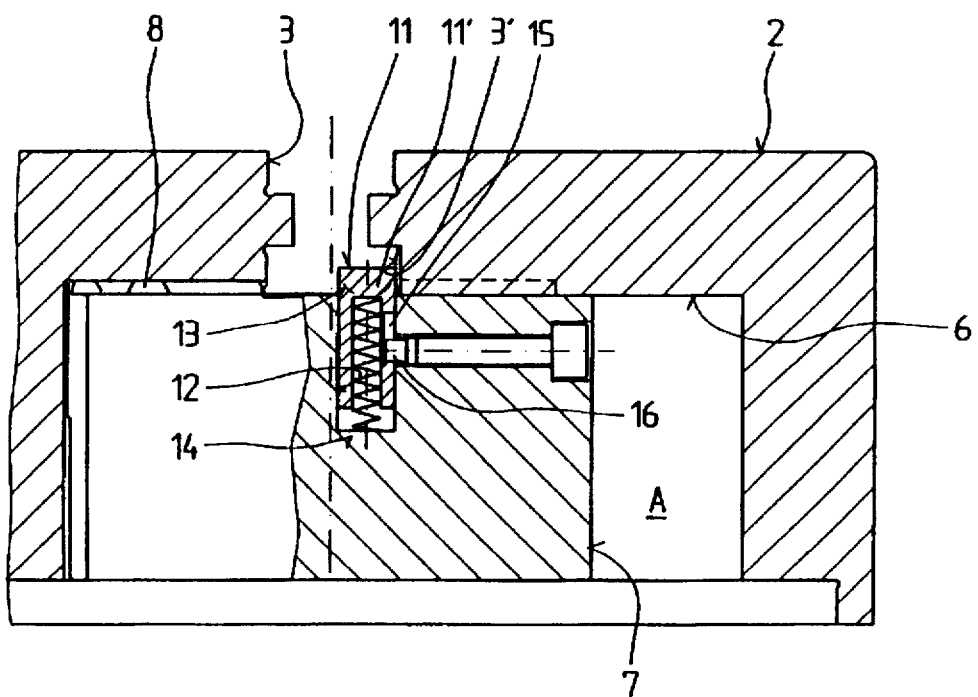
Figure 6:
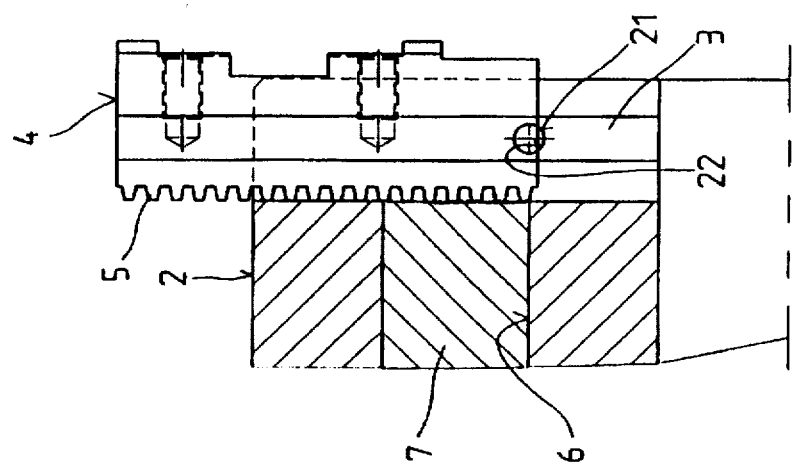
FIG. 6 is a cross-sectional view taken along the line VI—VI in FIG. 5.

In the end position illustrated in FIG. 4, in which the wedge bars 7 have been shifted during an exchange of jaws, the pin 11, after the jaw 4 has been removed from the guideway 3, catches in this guideway and a side surface thereof rests against the side surface 3' of the guideway 3. Thus, in this end position the wedge bar 7 is locked by the pin 11 and cannot move into the working space A.

Only after a jaw 4 has been inserted into the guide groove 3 is the locking action released. In such a case, the clamping jaw 4 acts upon the inclined surface 13 of the pin 11, so that counter to the force of the spring 14 the pin 11 is pushed back into the hole 12 and in this position is supported initially by the jaw 4 and after the wedge bar 7 has been shifted into the working space A is supported by the chuck body 2. In this connection, however, the pin 11 is disposed in the chuck body 2 in such a way that the pin 11 projects into the guideway 3 in a region coordinated with the engagement position of the teeth 5 of the jaws 4 with the teeth 8 of the wedge bars 7; this ensures not only that all of the jaws 4 of the chuck 1 are to be inserted into the guideways 3 to the same depth, but also in particular that upon insertion of a given jaw 4 a sufficient overlap of the teeth 5 of the jaws 4 with the teeth 8 of the wedge bars 7 is always provided.

So that the respective inclined surfaces 13 of the pins 11, which are disposed in the wedge bars 7 axially perpendicular to the guideways 3, are directed outwardly, pins 16 are inserted into the wedge bars 7 to engage elongated recesses 15 formed in the pins 11. This orients the pins 11 in the correct position.

In the embodiment shown in FIGS. 5 to 8, pins 21 are displaceably disposed in holes 22 of the chuck body 2; at an appropriate level or height, the pins 21 also project into the guideways 3 of the jaws 4. That end 21' of the pins 21 that faces the guideway 3 is provided with an inclined surface 23. With this modified embodiment, the pins 21 do not cooperate directly with the wedge bars 7, but rather operate respectively via a stop member 25 that are disposed in recessed portions 24 of the chuck body 2 and are displaceable axially perpendicular to the receiving pockets 6 that accommodate the wedge bars 7.

For this purpose, springs 26 are disposed between the stop members 25 and the chuck body 2. In addition, recesses 28 are formed in the stop members 25. Those ends 21" of the pins 21 that are remote from the guideways 3 extend into these recesses 28. Since inclined surfaces 27 are provided on the ends 21" of the pins 21, and counter surfaces 29 that cooperate therewith are provided on the stop members 25, the displacement movements of the pins 21, which are disposed in the chuck body 2 axially perpendicular to the guideways 3, can be redirected into an axially perpendicular movement of the stop members 25.

Figure 8:
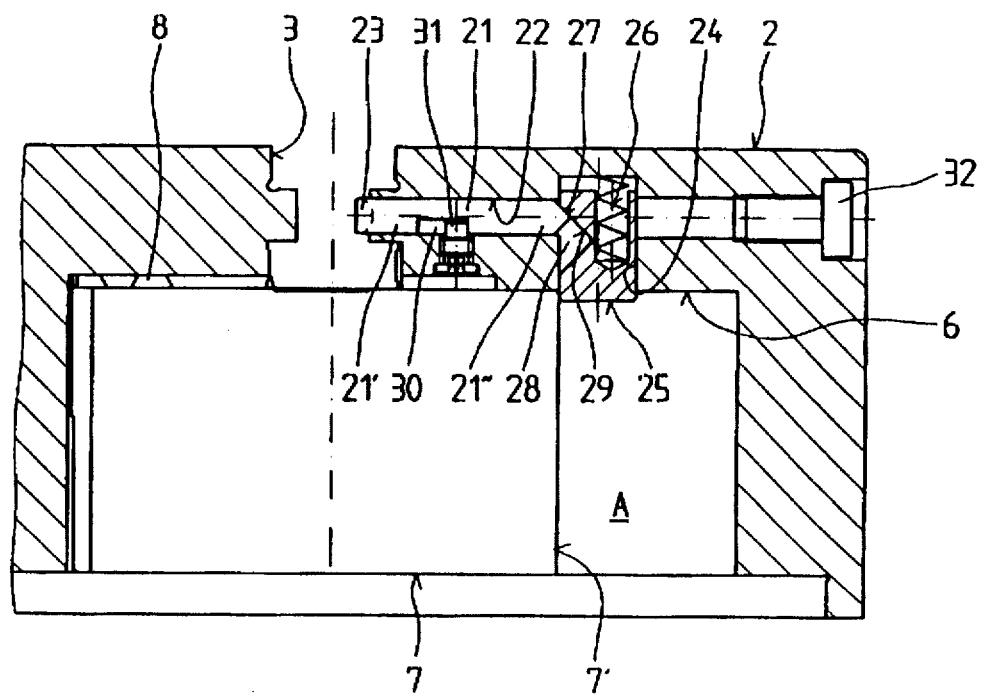

In the operating mode shown in FIG. 5, since the teeth 8 of the wedge bars 7 are no longer in engagement with the teeth 5 of the jaws 4, the jaws can be removed from the guideways 3. As soon as the pins 21 no longer rest against the jaws 4, the force of the springs 26, as shown in FIG. 8, shifts the stop members 25 in the direction of the receiving pockets 6 so that they project therein. In this operating mode the wedge bars 7 are locked in position by the stop members 25 since the latter cooperate with the end faces 7' of the wedge bars 7. Thus, the wedge bars 7 can no longer be introduced into the working space A, so that the chuck 1 cannot be placed into operation, especially since the non-illustrated key for actuating the wedge bars 7 cannot be removed. In addition, by means of the inclined surfaces 29 and 27, the pins 21 are introduced into the guideways 3. Only after jaws 4 have been reinserted into the guideways 3, and in particular at a height that ensures that a sufficient number of the teeth 5 of the jaws 4 engage with the teeth 8 of the wedge bars 7, are the pins 21 shifted toward the right by the jaws 4, as a result of which the stop members 25 are withdrawn from the receiving pockets 6 so that the wedge bars 7 can be introduced into the working space A and the chuck 1 is ready for operation.

To hold the pins 21 in a correctly oriented position, a respective pin 31 is provided that engage in elongated recesses 30 formed in the pins 21. Furthermore, the holes 22 that accommodate the pins 21 are closed off by screws or plugs 32.

The present invention is, of course, in no way restricted to the specific disclosure of the specification and drawings, but also encompasses any modifications within the scope of he appended claims.

What we claim is:

1. A chuck for turning machines, comprising:

a chuck body;

jaws that are respectively displaceable in radially extending guideways in said chuck body;

wedge bars for respectively operating said jaws, said wedge bars being disposed in receiving pockets in said chuck body transverse to a longitudinal axis of said chuck body, each of said wedge bars being provided with teeth for engaging teeth of a respective one of said jaws, said wedge bars being displaceable in said receiving pockets beyond a working space to such an extent that said teeth of said wedge bars disengage from said teeth of a pertaining jaw to allow removal of said jaw out of its guideway;

first pins disposed in said wedge bars or in said chuck body, said pins respectively extending into respective ones of said guideways of said jaws in a zone coordinated with an engagement position of said teeth of said jaws in said teeth of said wedge bars, each of said first pins having disposed on an end thereof that extends into said guideways an inclined surface that cooperates with the associated jaw, said first pins being displaceably guided against the force of spring means; and means for locking said wedge bars in an end position during removal of said jaws, wherein said means for locking said wedge bars comprise said first pins, which directly lock said wedge bars in said end position.

2. A chuck according to claim 1, wherein said first pins are displaceably oriented in position, axially perpendicular to said guideways, in holes formed in said wedge bars, and wherein to arrest said wedge bars in position, said first pins rest laterally against side surfaces of said guideways that face away from said working space of said wedge bars.

3. A chuck according to claim 2, wherein when said wedge bars are in said working space, said first pins are supported against said chuck body.

4. A chuck according to claim 2, wherein each of said first pins is provided with an axially directed recess, and each of said wedge bars has disposed therein, axially perpendicular to said first pin, a second pin that engages said recess of said first pin to hold said first pin in an oriented position.

5. A chuck for turning machines, comprising:

a chuck body;

jaws that are respectively displaceable in radially extending guideways in said chuck body;.

wedge bars for respectively operating said jaws, said wedge bars being disposed in receiving pockets in said chuck body transverse to a longitudinal axis of said chuck body, each of said wedge bars being provided with teeth for engaging teeth of a respective one of said jaws, said wedge bars being displaceable in said receiving pockets beyond a working space to such an extent that said teeth of said wedge bars disengage from said teeth of a pertaining jaw to allow removal of said jaw out of its guideway;

first pins disposed in said wedge bars or in said chuck body, said pins respectively extending into respective ones of said guideways of said jaws in a zone coordinated with an engagement position of said teeth of said jaws in said teeth of said wedge bars, each of said first pins having disposed on an end thereof that extends into said guideways an inclined surface that cooperates with the associated jaw, said first pins being displaceably guided against the force of spring means; and means for locking said wedge bars in an end position during removal of said jaws, wherein said means for locking said wedge bars comprise stop means that are actuated by said first pins.

6. A chuck according to claim 5, wherein each of said first pins is disposed, axially perpendicular to one of said guideways, in a hole formed in said chuck body adjacent to said guideway and on a side thereof that is closest to said working space of said wedge bar; wherein each of said stop means is disposed in a recessed portion formed in said chuck body axially perpendicular to said first pin, said stop means being spring-loaded in a direction toward said receiving pocket of said wedge bar; and wherein said first pin and said stop means cooperate via inclined surfaces.

7. A chuck according to claim 6, wherein when said jaws are being removed, an end face of said wedge bar that faces said working space rests against said stop means.

8. A chuck according to claim 6, wherein when said wedge bars are disposed in said working space, said first pins rest against said jaws.

9. A chuck according to claim 6, wherein each of said first pins, on an end thereof that faces said stop means, is provided with an inclined surface that extends at an angle to an axial direction of said pin, and wherein each of said stop means is provided with a recess for receiving said first pin, said recess being provided with a surface that cooperates with said inclined surface of said first pin.

10. A chuck according to claim 9, wherein each of said first pins is provided with an axially directed recess, and said chuck body has disposed therein, axially perpendicular to said first pin, a second pin that engages said last-mentioned recess of said first pin to hold said first pin in an oriented position.

* * * * *